United States Patent [19]

Takahashi et al.

[11] Patent Number: 4,980,384

[45] Date of Patent: Dec. 25, 1990

[54] FOAMABLE SILICONE RUBBER COMPOSITION AND METHOD FOR CURING THE SAME

[75] Inventors: Masaharu Takahashi; Takeo Yoshida, both of Gunma, Japan

[73] Assignee: Shin-Etsu Chemical Co., Ltd., Tokyo, Japan

[21] Appl. No.: 395,638

[22] Filed: Aug. 17, 1989

[30] Foreign Application Priority Data

Sep. 5, 1988 [JP] Japan .................... 63-222057

[51] Int. Cl.$^5$ ............................... C08J 9/02
[52] U.S. Cl. .......................... 521/91; 264/25; 521/92; 521/154; 521/915
[58] Field of Search ............ 264/25; 521/91, 92, 521/154, 915

[56] References Cited

U.S. PATENT DOCUMENTS

| | | | |
|---|---|---|---|
| 4,157,426 | 6/1979 | Hatanaka et al. | 521/154 |
| 4,189,545 | 2/1980 | Modic | 521/154 |
| 4,418,157 | 11/1983 | Modic | 521/154 |
| 4,590,220 | 5/1986 | Bauman et al. | 521/154 |
| 4,608,395 | 8/1986 | Hamada et al. | 521/154 |
| 4,618,645 | 10/1986 | Bauman et al. | 521/154 |
| 4,631,296 | 12/1986 | Bauman et al. | 521/154 |
| 4,634,733 | 1/1987 | Bauman et al. | 521/154 |
| 4,647,618 | 3/1987 | Bauman et al. | 521/154 |
| 4,692,474 | 9/1987 | Mayer et al. | 521/154 |
| 4,695,597 | 9/1987 | Seino | 521/154 |

*Primary Examiner*—Morton Foelak
*Attorney, Agent, or Firm*—Millen, White & Zelano

[57] ABSTRACT

A foamed cellular body of a cured silicone rubber composition can be obtained in a continuous process by irradiating a foamable silicone rubber composition containing, in addition to conventional diorganopolysiloxane, finely divided silica filler, blowing agent and cross-linking agent, a substantial amount of a dielectric inorganic powder, which is an iron oxide or a ferrite, with UHF microwaves. When the silicone rubber composition as molded is irradiated with UHF microwaves, the energy of the microwaves absorbed by the dielectric powder is efficiently converted into heat so that the molded body can be very evenly heated to effect foaming vulcanization of the composition giving a foamed and cured silicone rubber article having an excellently fine and uniform cellular structure.

12 Claims, No Drawings

FOAMABLE SILICONE RUBBER COMPOSITION AND METHOD FOR CURING THE SAME

BACKGROUND OF THE INVENTION

The present invention relates to a foamable silicone rubber composition and a method for curing the composition to give a cured and foamed cellular silicone rubber article. More particularly, the invention relates to a silicone rubber composition which can be foamed and cured into a cellular silicone rubber article without using any external heat source as well as to a novel and efficient method for simultaneously foaming and curing such a foamable silicone rubber composition in a continuous process as in the vulcanization following extrusion molding of the composition.

Several different processes are practiced in the prior art when a silicone rubber composition is desired to be cured or vulcanized in a continuous process to give a continuous-length cured silicone rubber body such as tubes including the hot-air vulcanization (HAV) method under normal pressure, continuous steam vulcanization (CV) method, liquid curing medium (LCM) method and the like. When a continuous-length cured silicone rubber body having a foamed and cellular structure is desired, however, these conventional methods are not always quite satisfactory in respect of the controllability of the process and obtaining a fine and uniform structure of the cured body.

Apart from silicone rubber compositions, there is an increasing general demand in recent years for various kinds of continuous-length thick-walled foamed rubber bodies in applications for gaskets and heat insulators in building works, rollers of a foamed rubber used, for example, as a fixing roller in xerographic copying machines and the like and a method for manufacturing such foamed rubber bodies with stability and low cost is eagerly desired to follow extrusion molding of the rubber composition. For example, a method is proposed and practiced in which a rubber composition of an ethylene-propylene-diene terpolymeric rubber, i.e. a so-called EPDM rubber, or a polychloroprene rubber is continuously extruded out of an extruder machine and then irradiated with ultrahigh-frequency electromagnetic waves so that the rubber composition absorbs the energy of the electromagnetic waves and heated up to the vulcanization temperature to be cured with simultaneous foaming by the decomposition of the blowing agent contained in the rubber composition. This method of irradiation with ultrahigh-frequency electromagnetic waves, referred to as the UHFV method hereinbelow, is considered not to be applicable to the continuous curing of silicone rubber compositions becuase the loss index in silicone rubbers is generally small not to ensure sufficient energy absorption of the electromagnetic waves.

The above mentioned UHFV method is performed usually at a frequency of 2450±50 MHz or 915±25 MHz so that it is essential that the rubber composition can absorb the energy of the electromagnetic waves of these frequencies in a high efficiency to be rapidly heated up to the vulcanization temperature. The energy P absorbed by a dielectric material under irradiation of UHF waves ogenerated in a microwave generator is given by the equation:

$$P = (5/9) f \cdot E^2 \cdot \epsilon \cdot \tan\delta \times 10^{10},$$

in which P is the energy absorbed and converted into heat in watts/m³; f is the frequency in Hz; E is the high-frequency electric field in volts/m; $\epsilon$ is the dielectric constant; and $\tan \delta$ is the dielectric loss factor. The product of ($\epsilon \cdot \tan\delta$) is called the loss index of the material. It is known that, in order that the UHFV method can be successfully applied to the foaming vulcanization of a rubber composition, the loss index of the rubber composition should desirably be at least 0.08 or, if possible, at least 0.2. To the contrary to this requirement, silicone rubber compositions generally have a very small loss index of only about 0.03 at a frequency of 3000 MHz. This is the reason for the general understanding that the UHFV method is not applicable to the foaming vulcanization of silicone rubber compositions.

Several attempts and proposals have been made in the prior art to obtain a silicone rubber composition having an increased loss index to meet the above mentioned requirement for the UHFV method. These prior art proposals are directed mainly to the modification of the organopolysiloxane as the principal ingredient of the silicone rubber composition. For example, Japanese Patent Kokai No. 52-37966 discloses an organopolysiloxane of which at least 5% by moles of the organic groups bonded to the silicon atoms are aliphatic hydrocarbon groups with substitution of aryl groups, chlorine atoms, fluorine atoms, mercapto groups or methylol groups or alkoxy groups. Such a modified organopolysiloxane, however, is not practical in respect of the great decrease in the heat resistance, weatherability, electric properties and surface properties of the cured silicone rubber which are the characteristics inherent in silicone rubbers in general.

SUMMARY OF THE INVENTION

The present invention accordingly has an object to provide a foamable silicone rubber composition which is cured with simultaneous foaming in a continuous process of the UHFV method without the above described problems and disadvantages in the prior art compositions as well as to provide a foaming vulcanization method of the foamable silicone rubber composition.

Thus, the foamable silicone rubber composition used in the inventive method comprises, as a blend:

(a) 100 parts by weight of a diorganopolysiloxane having an average degree of polymerization of 3,000 to 30,000 and represented by the average unit formula

$$R_a SiO_{(4-a)/2}, \tag{I}$$

in which R is a substituted or unsubstituted monovalent hydrocarbon group having 1 to 10 carbon atoms and the subscript a is a number in the range from 1.95 to 2.05;

(b) from 10 to 300 parts by weight of a finely divided silica filler;

(c) from 5 to 100 parts by weight of a dielectric inorganic powder which is (c−1) a powder of an iron oxide represented by the chemical formula

$$(FeO)_x \cdot (Fe_2O_3)_y, \tag{II}$$

in which the subscript x is a positive number in the range from 0.5 to 1.0 and the subscript y is zero or a positive number not exceeding 0.5 with the proviso that x+y is equal to 1, or (c−2) a powder of a ferrite represented by the general formula $$MO \cdot Fe_2O_3, \quad (III)$$

in which M is a divalent metallic element selected from the group consisting of manganese, copper, nickel, magnesium, cobalt, zinc and divalent iron;

(d) from 0.1 to 10 parts by weight of a blowing agent; and (e) a crosslinking agent.

The method of the present invention for the preparation of a foamed and cellular silicone rubber article comprises irradiating the above defined specific silicone rubber composition with ultrahigh-frequency microwaves to such as extent that the temperature of the composition is increased to the vulcanization temperature of the composition or, for example, to 160° C. or higher.

DETAILED DESCRIPTION OF THE PREFERRED EMBODIMENTS

As is described above, the most characteristic ingredient in the inventive foamable silicone rubber composition is the inorganic dielectric powder as the component (c), by virtue of which the silicone rubber composition is imparted with a greatly increased loss index to ensure highly efficient absorption of the microwave energy and successful foaming vulcanization of the composition.

The base ingredient in the inventive composition is the component (a) which is a diorganopolysiloxane represented by the average unit formula (I) given above. In the formula, the symbol R denotes a monovalent hydrocarbon group having 1 to 10 or, preferably, 1 to 8 carbon atoms exemplified by alkyl groups, such as methyl, ethyl, propyl and butyl groups, alkenyl groups, such as vinyl, allyl and butenyl groups, and aryl groups, such as phenyl and tolyl groups. The group R can be a substituted monovalent hydrocarbon group obtained by replacing a part or all of the hydrogen atoms in the above named hydrocarbon groups with halogen atoms, cyano groups and the like such as chloromethyl, 3-chloropropyl, 3,3,3-trifluoropropyl and 2-cyanoethyl groups. It is of course that two kinds or more of the groups R can be contained in the same diorganopolysiloxane molecules. It is, however, preferable that at least 98% by moles of the groups denoted by R are alkyl groups having 1 to 4 carbon atoms or, in particular, methyl groups, the balance, if any, being vinyl, phenyl and/or 3,3,3-trifluoropropyl groups. It is also preferable that at least a part of the groups denoted by R are vinyl groups so that the composition may have improved vulcanizability with an organic peroxide as a curing agent. The subscript a in the formula (I) is a positive number in the range from 1.95 to 2.05 or, preferably, 1.98 to 2.03. The diorganopolysiloxane molecules preferably have a straightly linear molecular structure having an average degree of polymerization in the range from 3,000 to 30,000 or preferably, from 4,000 to 10,000 from the standpoint of workability of the silicone rubber composition although a branched structure can be contained in the molecular structure to some extent.

The second essential ingredient in the inventive composition is the component (b) which is a finely divided silica filler. Such a silica filler is conventionally used in silicone rubber compositions with an object of reinforcement and improvement of workability. Several different types of silica fillers are known in the art including fumed silica fillers optionally surface-treated to be imparted with hydrophobicity, precipitated silica fillers, finely pulverized quartz powders, diatomaceous earth and the like. It is desirable that the finely divided silica filler has a specific surface area of at least 1 $m^2/g$ or, preferably, at least 50 $m^2/g$ in order to obtain full reinforcement. The amount of the silica filler in the inventive composition should be in the range from 10 to 300 parts by weight or, preferably, from 25 to 200 parts by weight per 100 parts by weight of the organopolysiloxane as the component (a). When the amount of the silica filler is too small, the desired effect of reinforcement cannot be obtained to a sufficient extent. When the amount of the silica filler is too large, on the other hand, great difficulties are encountered in compounding the filler with the organopolysiloxane or, even if the compounding work could be performed, the workability of the composition in extrusion molding would be extremely poor. It is of course optional that inorganic fillers of other types are compounded in combination with the silica filler including calcium silicate, carbon black, glass fibers and the like.

The third essential ingredient, i.e. component (c), is the most characteristic component in the inventive composition. Namely, the component (c) is an inorganic dielectric material in a finely divided form which serves to increase the energy absorption of the composition in a field of microwaves so as to convert the energy of the microwaves into heat. The dielectric inorganic material is, on one hand, is an iron oxide expressed by the chemical formula of $(FeO)_x \cdot (Fe_2O_3)_y$, in which x is a positive number in the range from 0.5 to 1.0 and y is zero or a positive number not exceeding 0.5 with the proviso that $x+y$ is equal to 1. An iron oxide having a structure of ferrite, i.e. $FeO \cdot Fe_2O_3$ is preferred. It is noted that the iron oxide powder conventionally used as a red pigment, which has a chemical formula of $Fe_2O_3$, is less effective for the purpose of the invention. The dielectric inorganic material, on the other hand, is a ferrite expressed by the formula $MO \cdot Fe_2O_3$, in which M is a divalent metallic element selected from the group consisting of manganese, copper, nickel, magnesium, cobalt and zinc. Examples of suitable ferrites include those expressed by the formulas:

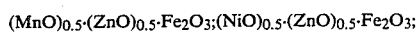

$(MnO)_{0.5} \cdot (ZnO)_{0.5} \cdot Fe_2O_3; (NiO)_{0.5} \cdot (ZnO)_{0.5} \cdot Fe_2O_3;$

$(MgO)_{0.5} \cdot (MnO)_{0.5} \cdot Fe_2O_3$ and the like. Two kinds or more of the divalent metallic elements can be contained in a ferrite. Divalent iron can be a part of the metallic elements of M in the ferrite. The powder of these iron oxides and ferrites should have a particle diameter in the range from 0.01 to 15 $\mu m$ or, preferably, from 0.1 to 5 $\mu m$. The amount of the dielectric inorganic powder in the inventive composition is in the range from 5 to 100 parts by weight or, preferably, from 25 to 100 parts by weight per 100 parts by weight of the organopolysiloxane as the component (a). When the amount thereof is too small, the efficiency of absorption of the microwave energy by the composition is very small not to ensure sufficient temperature increase. When the amount thereof is too large, on the other hand, the mechanical properties of the silicone rubber composition after curing would be badly affected if not to mention the disadvantage due to increase in the specific gravity of the cured rubber.

The component (d) is a blowing agent which is stable at room temperature but capable of producing a gas at an elevated temperature to expand the composition into a foamed or cellular body. Most of the known blowing agents producing nitrogen gas as the foaming gas can be used in the invention but those blowing agents producing carbon dioxide or other gases can also be used. Examples of the blowing agent suitable in the invention include azobisisobutyronitrile, dinitrosopentamethylene tetramine, benzene sulfone hydrazide, N,N'-dinitroso-N,N'-dimethyl terephthalamide, azodicarbondiamide and the like. The amount of the blowing agent in the inventive composition naturally depends on the desired degree of foaming but it is usually in the range from 1 to 10 parts by weight or, preferably, from 3 to 7 parts by weight per 100 parts by weight of the organopolysiloxane as the component (a).

The component (e) is a crosslinking agent which serves to cure the composition when the composition is heated at an elevated temperature. Typically, the crosslinking agent is an organic peroxide exemplified by benzoyl peroxide, monochlorobenzoyl peroxide, 4-methyl benzoyl peroxide, 2,4-dichlorobenzoyl peroxide, tert-butyl perbenzoate, dicumyl peroxide, 2,5-bis(-tert-butyl peroxy)-2,5-dimethyl hexane, 2,5-bis(tert-butyl peroxy)-2,5-dimethyl hexyne, dimyristylperoxy dicarbonate, dicyclododecylperoxy dicarbonate, tert-butyl monoperoxy carbonate and the like as well as a compound of the structural formula $$ROO-CO-O-CH_2-C(CH_3)_2-CH_2-O-CO-OOR,$$

in which R is a monovalent hydrocarbon group having 3 to 10 carbon atoms. These organic peroxides can be used either singly or as a combination of two kinds or more according to need. The amount of the organic peroxide as the crosslinking agent in the inventive composition is in the range from 0.5 to 5 parts by weight per 100 parts by weight of the organopolysiloxane as the component (a).

An alternative way to effect crosslinking of the organopolysiloxane is to utilize the so-called hydrosilation reaction. When the organopolysiloxane as the component (a) has at least two vinyl groups bonded to the silicon atoms in a molecule, namely, the silicon-bonded vinyl groups are susceptible to the addition reaction with hydrogen atoms directly bonded to the silicon atoms of another organopolysiloxane in the presence of a platinum catalyst. Therefore, the above mentioned organic peroxide as a crosslinking agent can be replaced with a combination of an organohydrogenpolysiloxane having at least two hydrogen atoms directly bonded to the silicon atoms in a molecule and a catalytic amount of a platinum compound. The organohydrogenpolysiloxane is represented by the average unit formula $R^1{}_bH_cSiO_{(4-b-c)/2}$, in which $R^1$ is a substituted or unsubstituted monovalent hydrocarbon group or, preferably, a methyl group and b and c are each a positive number with the proviso that b+c is 1.0 to 3.0. The amount of the organohydrogenpolysiloxane in the inventive composition should be sufficient to provide from 50 to 300% by moles of the silicon-bonded hydrogen atoms based on the vinyl groups in the component (a). The platinum compound is preferably chloroplatinic acid, for example, in the form of an alcohol solution or a complex thereof with an olefin, vinylsiloxane and the like. The amount of the platinum compound calculated as platinum in the composition is usually in the range from 0.5 to 500 ppm by weight or, preferably, from 2 to 200 ppm by weight based on the amount of the organopolysiloxane as the component (a).

The foamable silicone rubber composition of the present invention can be obtained by uniformly blending the above described components (a) to (e) each in a specified amount. The composition can optionally be admixed with various kinds of known additives according to need including processing or dispersion aids such as low-molecular organopolysiloxanes, silanol compounds, alkoxy silanes and the like, heat-resistance improvers such as iron oxide, ceric oxide, iron octoate, titanium dioxide and the like, coloring agents, flame retardant agents, foaming controlling agents and so on. It should be noted that, when an iron oxide expressed by the formula (II) is used as a heat-resistance improver, the total amount of the component (c) and the iron oxide as the heat-resistance improver should not exceed 100 parts by weight per 100 parts by weight of the component (a).

The foamable silicone rubber composition of the invention prepared in the above described manner can absorb the energy of microwaves with high efficiency by virtue of the specific inorganic dielectric powder as the component (c) to convert the energy of microwaves into heat so as to increase the temperature of the composition up to the vulcanization temperature of the composition. Therefore, a continuous-length foamed silicone rubber body can be easily obtained by continuously extruding the rubber composition out of an extruder machine, for example, of a vent type and introducing the extruded body into a chamber where the extruded body is exposed to UHF microwaves at a frequency in the range from 900 to 5000 MHz or, in particular, a frequency of 2450±50 MHz or 915±25 MHz and heated to a temperature of, for example, 160° C. or higher to effect curing of the composition and expansion thereof by the decomposition of the blowing agent. It is sometimes advantageous that the above mentioned UHFV chamber is provided with a separate heating means, e.g., circulation of hot air through the atmosphere, to promote temperature increase of the extruded body by heating the ambient atmosphere. Although expansion and curing of the composition are usually complete inside the UHFV chamber, it is further optional or sometimes advantageous that the thus foamed and cured silicone rubber body is subjected to a secondary vulcanization treatment by the conventional hot-air vulcanization method, fluidized-bed vulcanization method and the like so that curing of the composition is more complete and some decomposition products produced in the UHFV process can be removed to improve the properties and stability of the thus obtained foamed silicone rubber body.

The foamed silicone rubber body obtained from the inventive silicone rubber composition is advantageous in respect of the high heat and cold resistance, weatherability and excellent electric properties as well as low permanent compression set because the inorganic dielectric powder as the characteristic component in the inventive composition has no particular adverse influences on these properties, the other components being rather conventional. Moreover, the foamed body is also advantageous in respect of the uniformity of the foamed cellular structure thereof because heating of the composition is effected not from the surface alone but the heat is generated uniformly throughout the body of the composition due to absorption of the microwave energy by the particles of the inorganic dielectric powder distributed uniformly throughout the composition.

In the following, the invention is described in more detail by way of examples and comparative examples, in which the term of "parts" always refers to "parts by weight".

EXAMPLE 1

A base compound, referred to as the compound I hereinbelow, was prepared by mixing 100 parts of a gum-like organopolysiloxane having an average degree of polymerization of about 8000 and composed of 99.825% by moles of dimethyl siloxane units, 0.15% by moles of methyl vinyl siloxane units and 0.025% by moles of dimethyl vinyl siloxane units and 40 parts of a fumed silica filler (Aerosil 200, a product by Nippon Aerosil Co.) together with 3 parts of diphenyl silane diol and 4 parts of a low-molecular dimethylpolysiloxane fluid having a degree of polymerization of 10 and end-blocked with silanol groups as the dispersion aids of the filler and uniformly blending the mixture on a two-roller mill followed by a heat treatment of the blend at 150° C. for 4 hours.

Five foamable silicone rubber compositions, referred to as the compositions I, II, III, IV and V hereinbelow, were prepared each by uniformly blending, on a two-roller mill, 100 parts of the above prepared compound I, a powder of iron oxide $FeO \cdot Fe_2O_3$ having an average particle diameter of about 2 μm or a powder of a ferrite $(MnO)_{0.32} \cdot (ZnO)_{0.14} \cdot (FeO)_{0.04} \cdot (Fe_2O_3)_{0.50}$ (Ferrotop BSF 547, a product by Toda Kogyo Co.) having an average particle diameter of about 1.7 μm in an amount indicated in Table 1 below, 2.5 parts (compositions I, II and III) or 3.0 parts (compositions IV and V) of azobisisobutyronitrile, 0.5 part (compositions I, II and IV) or 0.4 part (compositions III and V) of 2,4-dichlorobenzoyl peroxide and 1.5 parts of dicumyl peroxide.

Each of the compositions I to V was introduced into an extruder machine having a cylinder of diameter D of 40 mm and length L of 480 mm (L/D=12) and a die of an outer diameter of 20 mm and inner diameter of 10 mm mounted thereon and extruded at a temperature of 15° to 30° C. into a tubular form of an outer diameter of 20 mm and inner diameter of 10 mm. The thus extruded tubular body of the silicone rubber composition was introduced, at a velocity of 1.5 meters/minute, into a UHFV zone formed of two chambers connected in tandem each having a length of 1.5 meters and connected to a microwave generator of 1.0 kilowatt output at a frequency of 2450±50 MHz. Each of the UHFV chambers was under circulation of hot air at a temperature of 130° C.

The condition of curing in each of the thus prepared foamed and cured silicone rubber tubes was complete and the cellular structure thereof was fine and uniform with a ratio of expansion shown in Table 1.

TABLE 1

| Composition No. | I | II | III | IV | V |
|---|---|---|---|---|---|
| Iron oxide, parts | — | — | — | 30 | 60 |
| Ferrite, parts | 20 | 35 | 50 | — | — |
| Ratio of expansion, % | 315 | 380 | 367 | 355 | 326 |

With an object to test the effect by the concurrent hot air circulation with the microwave irradiation, the same experimental procedure as above was undertaken by using the composition III except that the velocity of transfer of the extruded tubular body was decreased to 0.25 meter/minute and hot air was not introduced into the chambers. The results was that the condition of curing in the thus prepared foamed and cured silicone rubber tube was complete and the cellular structure thereof was fine and uniform with a ratio of expansion of 345%.

For comparison, another silicone rubber composition, referred to as the composition VI hereinbelow, was prepared in the same formulation as in the composition II above excepting omission of the ferrite powder. The result of the foaming vulcanization test of this composition undertaken in the same manner as for the composition II was that the curing of the composition was incomplete and the cellular structure of the tubular body was coarse and uneven with a ratio of expansion of only 132%. For further comparison, the compositions II and VI were processed in the same manner as above except that no UHF microwaves were introduced into the UHFV chambers. The results were that each of the compositions remained in an unvulcanized condition almost without foaming to give a cellular structure.

EXAMPLE 2

A base compound, referred to as the compound II hereinbelow, was prepared by mixing 100 parts of a gum-like organopolysiloxane having an average degree of polymerization of about 8000 and composed of 99.775% by moles of dimethyl siloxane units, 0.200% by moles of methyl vinyl siloxane units and 0.025% by moles of dimethyl vinyl siloxane units, 20 parts of a fumed silica filler (Aerosil 200, supra) and 20 parts of a precipitated silica filler (Nipsil $VN_3LP$, a product by Nippon Silica Co.) together with 3 parts of diphenyl silane diol and 5 parts of dimethyl dimethoxy silane as the dispersion aids of the fillers and uniformly blending the mixture on a two-roller mill followed by a heat treatment of the blend at 150° C. for 4 hours.

Two foamable silicone rubber compositions, referred to as the compositions VII and VIII hereinbelow, were prepared each by uniformly blending 100 parts of the compound II prepared above, 35 parts or 70 parts, respectively, of the same ferrite powder as used in Example 1, 2.5 parts of azobisisobutyronitrile, 0.6 part of 2,4-dichlorobenzoyl peroxide and 0.3 part of 2,5-dimethyl-2,5-(ditert-butylperoxy)hexane.

Each of the compositions VII and VIII was subjected to the foaming vulcanization test in the same manner as in Example 1 except that the velocity of transfer of the extruded tubular body through the UHFV chambers was 3 meters/minute and the output of each microwave generator for the composition VIII was decreased to 0.5 kilowatt instead of 1.0 kilowatt.

The results were that the condition of curing was complete and the cellular structure of the foamed silicone rubber tubes was fine and uniform in each of the compositions with the ratio of expansion of 400% and 355% for the compositions VII and VIII, respectively.

For comparison, another silicone rubber composition, referred to as the composition IX hereinbelow, was prepared in the same formulation as in the composition VII above excepting omission of the ferrite powder. The result of the foaming vulcanization test of this composition IX undertaken under the same conditions for the composition VII was that the condition of curing was incomplete and the portion in the vicinity of the inner walls of the tube remained unfoamed while coarse and uneven cells were formed in the vicinity of the outer surface with an overall ratio of expansion of only 158%. When the foaming vulcanization test of the composition IX was repeated in the same manner as above excepting omission of application of the UHF microwaves, the extruded tubular body coming out of the UHFV chambers was found unvulcanized without foaming.

EXAMPLE 3

A foamable silicone rubber composition was prepared by uniformly blending, on a two-roller mill, 100 parts of the compound I prepared in Example 1,50 parts of the same ferrite powder as used in Example 1,2.5 parts of azobisisobutyronitrile, 0.06 part of a 1% by weight solution of chloroplatinic acid in butyl alcohol, 0.02 part of 1,3-divinyl-1,1,3,3-tetramethyl disiloxane, and 0.5 part of a methyl hydrogen polysiloxane having a viscosity of 10 centistokes at 25° C. and expressed by the formula Me$_3$Si—O—(—SiMe$_2$—O—)$_8$—(—SiHMe—O—)$_2$—SiMe$_3$, in which Me is a methyl group. After standing at room temperature for 1 hour, the composition was subjected to foaming vulcanization in the same manner as in Example 1. The result was that the cured and foamed silicone rubber tube thus obtained was in a completely cured condition having a uniform and fine cellular structure with a ratio of expansion of 353%.

What is claimed is:

1. A method for the preparation of a foamed cellular body of a cured silicone rubber composition which comprises irradiating a foamable silicone rubber composition comprising, as a blend:
   (a) 100 parts by weight of a diorganopolysiloxane having an average degree of polymerization of 3,000 to 30,000 and represented by the average unit formula $R_a SiO_{(4-a)/2}$, in which R is a substituted or unsubstituted monovalent hydrocarbon group having 1 to 10 carbon atoms and the subscript a is a number in the range from 1.95 to 2.05;
   (b) from 10 to 300 parts by weight of a finely divided silica filler;
   (c) from 5 to 100 parts by weight of a dielectric inorganic powder which is (c−1) a powder of an iron oxide represented by the chemical formula $(FeO)_x \cdot (Fe_2O_3)_y$, in which the subscript x is a positive number in the range from 0.5 to 1.0 and the subscript y is zero or a positive number not exceeding 0.5 with the proviso that x+y is equal to 1, or (c−2) a powder of a ferrite represented by the general formula $MO \cdot Fe_2O_3$, in which M is a divalent metallic element selected from the group consisting of manganese, copper, nickel, magnesium, cobalt, zinc and divalent iron or (c−3) or a combination thereof;
   (d) from 0.1 to 10 parts by weight of a blowing agent; and
   (e) a crosslinking agent, with ultrahigh-frequency microwaves of the frequency in the range from 900 MHz to 5000 MHz to such an extent that the silicone rubber composition is heated to a temperature of about 160° C. or higher.

2. The method according to claim 1 wherein at least 98% by moles of the groups denoted by R in the diorganopolysiloxane are methyl groups.

3. The method according to claim 1 wherein the finely divided silica filler has a specific surface area of at least 1 m$^2$/g.

4. The method according to claim 1 wherein the dielectric inorganic powder has a particle diameter in the range from 0.01 μm to 15 μm.

5. The method according to claim 1 wherein the blowing agent is selected from the group consisting of azobisisobutyronitrile, dinitrosopentamethylene tetramine, benzene sulfone hydrazide, N,N'-dinitroso-N,N'-dimethyl terephthalamide and azodicarbondiamide.

6. The method according to claim 1 wherein the crosslinking agent is an organic peroxide.

7. The method according to claim 6 wherein the amount of the organic peroxide is in the range from 0.5 to 5 parts by weight per 100 parts by weight of the diorganopolysiloxane as the component (a).

8. The method according to claim 1 wherein at least two of the groups denoted by R bonded to the silicon atoms in a molecule of the diorganopolysiloxane are vinyl groups.

9. The method according to claim 8 wherein the crosslinking agent is a combination of an organohydrogenpolysiloxane and a platinum compound.

10. The method according to claim 1 wherein irradiation of the silicone rubber composition with the ultrahigh-frequency microwaves is performed in an atmosphere of an increased ambient temperature by means of a separate heating means.

11. The method according to claim 10 wherein the separate heating means is circulation of hot air in the atmosphere.

12. The method according to claim 1, wherein at least 98% by moles of the groups denoted by R in the diorganopolysiloxane are methyl groups; wherein at least two of the groups denoted by R bonded to the silicon atoms in a molecule of the diorganopolysiloxane are vinyl groups; wherein the finely divided silica filler has a specific surface area of at least 1 m$^2$/g; wherein the dielectric inorganic powder has a particle diameter in the range from 0.01 μm to 15 μm; and wherein the crosslinking agent is a combination of an organohydrogenpolysiloxane and a platinum compound.

* * * * *